(12) United States Patent
Furukawa et al.

(10) Patent No.: US 10,843,811 B2
(45) Date of Patent: Nov. 24, 2020

(54) CYLINDRICAL CASE AND JET ENGINE

(71) Applicant: IHI Corporation, Koto-ku (JP)

(72) Inventors: Hiroyuki Furukawa, Tokyo (JP);
Tetsuya Yoshiara, Tokyo (JP); Agamu Tanaka, Tokyo (JP); Yuuji Mori, Tokyo (JP)

(73) Assignee: IHI Corporation, Koto-ku (JP)

( * ) Notice: Subject to any disclaimer, the term of this patent is extended or adjusted under 35 U.S.C. 154(b) by 549 days.

(21) Appl. No.: 15/451,839

(22) Filed: Mar. 7, 2017

(65) Prior Publication Data

US 2017/0174359 A1 Jun. 22, 2017

Related U.S. Application Data

(63) Continuation of application No. PCT/JP2015/078263, filed on Oct. 6, 2015.

(30) Foreign Application Priority Data

Dec. 26, 2014 (JP) ................................ 2014-264096

(51) Int. Cl.
*B64D 45/02* (2006.01)
*F02K 3/06* (2006.01)
(Continued)

(52) U.S. Cl.
CPC ............... *B64D 45/02* (2013.01); *B64C 7/02* (2013.01); *B64D 27/16* (2013.01); *B64D 29/00* (2013.01);
(Continued)

(58) Field of Classification Search
CPC ........ B64D 29/00; B64D 29/06; B64D 27/16; B64D 45/02; H05F 3/00; H05F 3/02; B64C 7/02; F02C 7/00; F02K 3/06; F04D 29/54
(Continued)

(56) References Cited

U.S. PATENT DOCUMENTS 3,755,713 A * 8/1973 Paszkowski .......... B29C 70/885
361/218
3,989,984 A * 11/1976 Amason ................ B29C 70/885
361/212
(Continued)

FOREIGN PATENT DOCUMENTS

CN 103124834 A 5/2013
CN 103826832 A 5/2014
(Continued)

OTHER PUBLICATIONS

International Search Report dated Jan. 12, 2016 in PCT/JP2015/078263 filed on Oct. 6, 2015 (with English translation).
(Continued)

*Primary Examiner* — Alexander B Comley
(74) *Attorney, Agent, or Firm* — Oblon, McClelland, Maier & Neustadt, L.L.P.

(57) ABSTRACT

A case body of a fan case in a jet engine is formed by use of a composite material of carbon fiber reinforced plastic. Metal rings are respectively attached to a leading edge and a trailing edge of the case body. The metal rings are electrically connected together by a conductive cable. Both of the metal rings and the conductive cable constitute a path of a lightning current.

12 Claims, 5 Drawing Sheets

(51) Int. Cl.
- *F02C 7/00* (2006.01)
- *B64D 29/06* (2006.01)
- *F04D 29/54* (2006.01)
- *B64C 7/02* (2006.01)
- *B64D 27/16* (2006.01)
- *B64D 29/00* (2006.01)

(52) U.S. Cl.
CPC ............... *B64D 29/06* (2013.01); *F02C 7/00* (2013.01); *F02K 3/06* (2013.01); *F04D 29/54* (2013.01)

(58) Field of Classification Search
USPC .................................................. 361/218, 212
See application file for complete search history.

(56) References Cited

U.S. PATENT DOCUMENTS

| | | | | |
|---|---|---|---|---|
| 4,479,163 A * | 10/1984 | Bannink, Jr. | ........... | B64D 45/02 244/1 A |
| 4,755,904 A * | 7/1988 | Brick | ........... | B64D 45/02 244/1 A |
| 4,760,493 A * | 7/1988 | Pearson | ........... | B64D 45/02 244/1 A |
| 5,278,721 A * | 1/1994 | Fenster | ........... | H05F 3/00 244/1 A |
| 5,499,782 A * | 3/1996 | Domine | ........... | B32B 5/28 244/1 A |
| 5,862,032 A | 1/1999 | Cann | | |
| 7,050,286 B2 * | 5/2006 | Pridham | ........... | B64D 45/02 244/1 A |
| 7,886,439 B2 * | 2/2011 | Braden | ........... | H01R 4/646 244/1 A |
| 7,963,477 B2 * | 6/2011 | Soula | ........... | B64C 1/061 244/1 A |
| 8,305,727 B2 * | 11/2012 | West | ........... | H01R 4/643 361/212 |
| 8,400,749 B2 * | 3/2013 | West | ........... | H01R 4/64 361/216 |
| 8,699,203 B2 * | 4/2014 | Le Louarn | ........... | B64D 45/02 361/117 |
| 2005/0213278 A1 * | 9/2005 | Hawley | ........... | B64D 45/02 361/212 |
| 2007/0236855 A1 * | 10/2007 | Le | ........... | B64D 45/02 361/212 |
| 2008/0145215 A1 * | 6/2008 | Finn | ........... | F01D 21/045 415/200 |
| 2011/0133035 A1 | 6/2011 | Vauchel et al. | | |
| 2011/0284688 A1 * | 11/2011 | Chuc | ........... | B64C 27/32 244/1 A |
| 2011/0284694 A1 | 11/2011 | Yamaguchi et al. | | |
| 2012/0034076 A1 | 2/2012 | Xie | | |
| 2012/0063050 A1 | 3/2012 | Langone et al. | | |
| 2012/0148392 A1 * | 6/2012 | Lussier | ........... | F01D 21/045 415/200 |
| 2012/0163990 A1 | 6/2012 | Shimono et al. | | |
| 2012/0258323 A1 * | 10/2012 | Brown | ........... | B64D 45/02 428/457 |
| 2013/0264110 A1 * | 10/2013 | Willmot | ........... | F02C 7/12 174/521 |
| 2014/0002947 A1 * | 1/2014 | Quayle | ........... | B64D 45/02 361/218 |
| 2014/0217652 A1 | 8/2014 | Varin et al. | | |
| 2014/0325994 A1 * | 11/2014 | Dowdell | ........... | H01R 12/77 60/801 |
| 2015/0225087 A1 * | 8/2015 | Tanaka | ........... | F01D 25/243 415/200 |
| 2015/0275689 A1 | 10/2015 | Lussier et al. | | |
| 2016/0108747 A1 | 4/2016 | Obuchi et al. | | |
| 2016/0194091 A1 | 7/2016 | Obuchi et al. | | |
| 2017/0174359 A1 | 6/2017 | Furukawa et al. | | |

FOREIGN PATENT DOCUMENTS

| | | |
|---|---|---|
| EP | 3 181 883 A1 | 6/2017 |
| JP | 2001-88793 | 4/2001 |
| JP | 2009-531863 | 9/2009 |
| JP | 2011-51517 | 3/2011 |
| JP | 2012-135994 | 7/2012 |
| JP | 2012-527375 | 11/2012 |
| JP | 2013-541660 A | 11/2013 |
| JP | 2014-83792 | 5/2014 |
| JP | 2015-59460 | 3/2015 |
| RU | 2 509 686 C2 | 9/2012 |
| WO | WO 2010/064463 A1 | 6/2010 |
| WO | WO 2012/018919 A1 | 2/2012 |
| WO | WO 2015/001827 A1 | 1/2015 |

OTHER PUBLICATIONS

Written Opinion dated Jan. 12, 2016 in PCT/JP2015/078263 filed on Oct. 6, 2015.
Extended European Search Report dated Mar. 19, 2018 in Patent Application No. 15872410.4, 6 pages.
Combined Office Action and Search Report dated Apr. 8, 2018 in Chinese Patent Application No. 201580060135.X (with English translation of categories of cited documents), 6 pages.
Decision to Grant dated Jul. 13, 2018 in Russian Patent Application No. 2017122969 (with English translation), 14 pages.
Decision to Grant dated Sep. 11, 2018 in Japanese Patent Application No. 2014-264096.

* cited by examiner

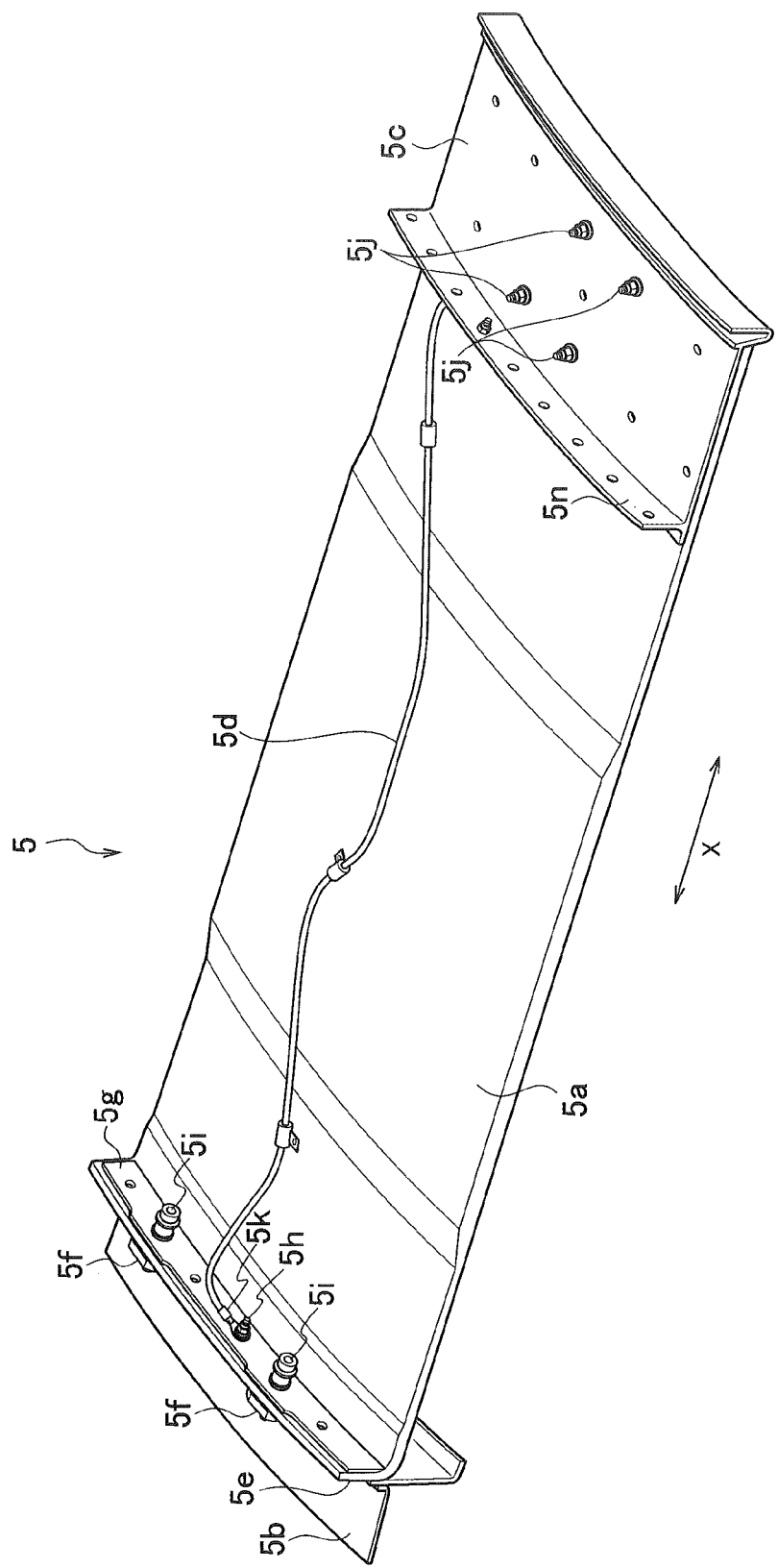

CYLINDRICAL CASE AND JET ENGINE

CROSS REFERENCE TO RELATED APPLICATIONS

This application is a continuation application of International Application No. PCT/JP2015/078263, filed on Oct. 6, 2015, which claims priority to Japanese Patent Application No. 2014-264096, filed on Dec. 26, 2014, the entire contents of which are incorporated by reference herein.

BACKGROUND

1. Technical Field

The present disclosure relates to a cylindrical case used as a fan case that covers a fan blade of a jet engine for aircraft and so forth.

2. Description of the Related Art

In a case where an aircraft has been struck by lightning, a lightning current thereof flows from a position that has been struck by lightning through an air frame, is discharged from a static discharger and other measures into the air, and thereby electric charges in the air frame are removed. Note that, also a jet engine housed in a nacelle of the air frame serves as part of a path that the lightning current flows.

Incidentally, it is demanded that components that constitute the jet engine be high in strength conventionally. In addition to this, it is demanded that, for example, a fan case that covers a fan blade be light-weighted for the purpose of improving fuel efficiency of the jet engine. Accordingly, there is such a trial that a composite material (for example, carbon fiber reinforced plastic: CFRP) obtained by impregnating reinforced fibers with a resin material such as a thermosetting resin and a thermoplastic resin is used as a raw material of the fan case in order to attain both of demands for high strength and light weight.

The electrical resistance of the above-mentioned composite material is very high. Therefore, in a case where the composite material is used for the fan case, how a function as the path that the lightning current flows when the aircraft is struck by lightning is preserved in the fan case becomes a problem. Accordingly, it is conceived to apply a composite material panel structural body that has been proposed in JP 2012-135994 A (Patent Literature 1) to the fan case.

The composite material panel structural body of Patent Literature 1 has a plurality of composite material panels. Each composite material panel has a reinforced fiber base material, and a conductive mesh sheet and a bag film that have been laminated on one surface side of the reinforced fiber base material. The conductive mesh sheet is located between the reinforced fiber base material and the bag film and an edge thereof is exposed from the bag film. The composite material panel structural body is constituted by bringing exposed parts of the conductive mesh sheets of the respective composite material panels into contact with one another and joining them together.

SUMMARY OF THE INVENTION

However, in the above-mentioned composite material panel structural body, the conductive mesh sheets are not exposed to the outside except the joined parts among the composite material panels. Accordingly, it is necessary to guide the lightning current from the outside to the inside of the bag film in order to use the conductive mesh sheets as the path of the lightning current. In addition, also in a case where the lightning current is guided inside the bag film, it is also thought that high heat may be generated in the mesh sheets with the lightning current.

An object of the present disclosure is to provide a cylindrical case that can function as the path of the lightning current when the aircraft has been struck by lightning even when it is formed by use of a composite material of high electrical resistance and a jet engine that has used this.

According to one aspect of the present disclosure, there is provided a cylindrical case including: a case body that is formed of a composite material obtained by impregnating reinforced fibers with a thermosetting resin and constitutes a cylindrical structural part of a jet engine; one pair of cylindrical metal rings that are respectively arranged on positions that are spaced at intervals in a central axis direction of the case body on a surface of the case body and are respectively coupled to mutually different conductive parts of an air frame or the jet engine of an aircraft in which the jet engine is mounted; and at least one conductive cable that electrically connects between the one pair of metal rings.

The at least one conductive cable may include a plurality of conductive cables. Each of the conductive cables may electrically connect between the one pair of metal rings at positions that are spaced at intervals in a circumferential direction of the case body.

The cylindrical case may be used as a fan case that covers a fan blade of the jet engine. In the one pair of metal rings, one may be coupled to a nacelle of the aircraft and the other may be coupled to an outer circumferential edge of a structural guide vane of the jet engine.

The case body may be formed into a double tube shape in which a first cylinder section and a second cylinder section that is smaller in diameter than the first cylinder section are connected together via a connection section. The one pair of metal rings may be arranged on respective surfaces of the first cylinder section and the second cylinder section one by one.

The first cylinder section may be used as an engine case that faces a fan case that covers a fan blade of the jet engine and is arranged inside the fan case. The second cylinder section may be used as a compressor case that covers a compressor of the jet engine. In the one pair of metal rings, one may be coupled to an inner circumferential edge of a structural guide vane of the jet engine and the other may be coupled to a beam having one end coupled to the air frame.

According to the present disclosure, even when the cylindrical case is formed by use of the composite material of high electrical resistance, the cylindrical case concerned can function as the path of the lightning current when the air frame of the aircraft is struck by lightning.

BRIEF DESCRIPTION OF THE DRAWINGS

FIG. 3 is a perspective view showing one part in a circumferential direction of a fan case including a case body, relating to one embodiment of the present disclosure.

DESCRIPTION OF THE EMBODIMENTS

In the following, a cylindrical case relating to one embodiment of the present disclosure will be described with reference to the drawings. First, a jet engine to which the cylindrical case of the present embodiment is applied will be described with reference to FIG. 1. Here, the jet engine is housed in a nacelle of an aircraft.

Figure 1:
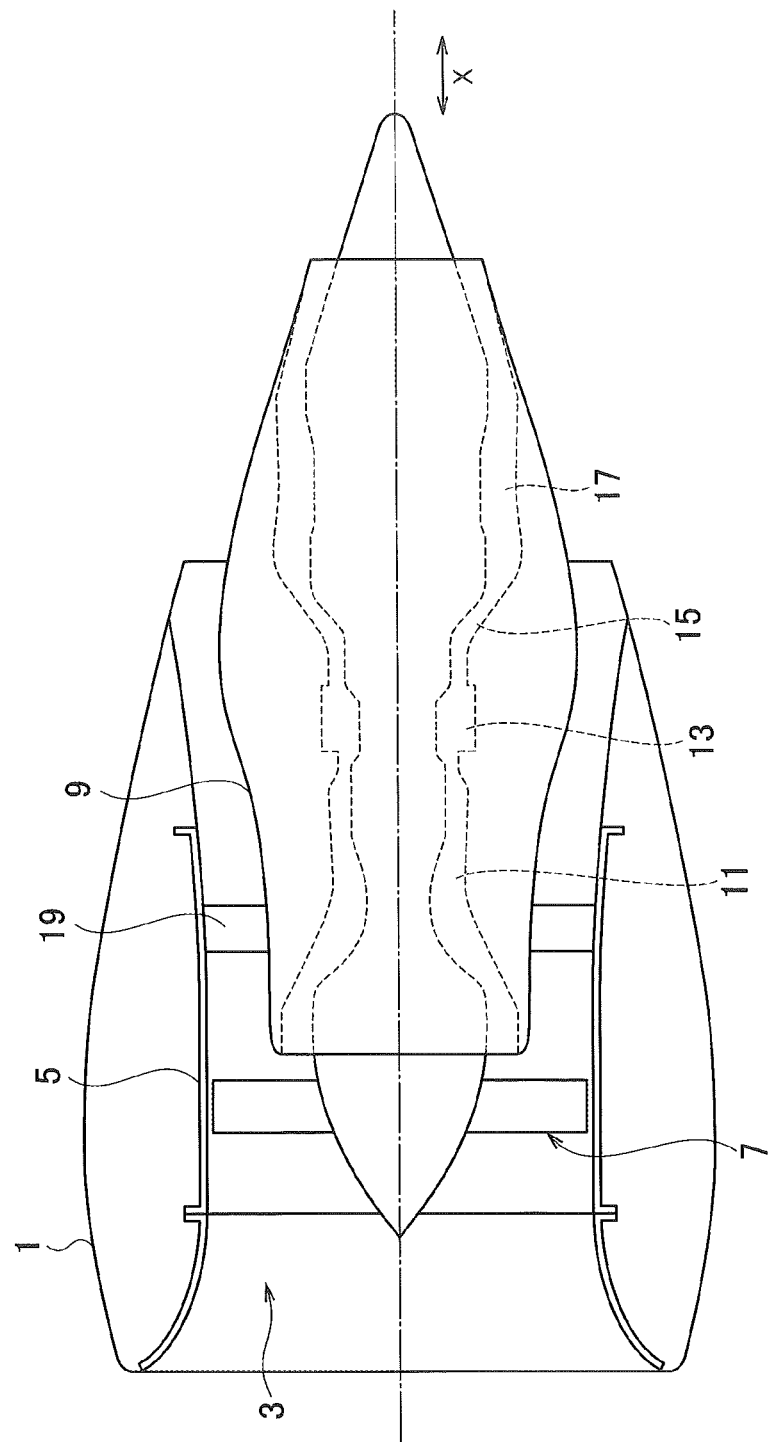
FIG. 1 is an explanatory diagram showing a state where a jet engine to which a cylindrical case relating to one embodiment of the present disclosure is applied is housed in a nacelle of an aircraft.

As shown by a reference symbol 1 in FIG. 1, a jet engine 3 is housed in a nacelle 1 of an aircraft (not shown). The jet engine 3 takes in air from the front (the left side in FIG. 1) of the nacelle 1 into a cylindrical fan case 5 and sends it into a compressor 11 in an engine case 9 that is arranged inside the fan case 5 by a fan (a moving blade) 7. Here, the fan 7 has the fan case 5, and a plurality of fan blades covered with the fan case 5.

Then, the air is compressed by the compressor 11 and fuel is injected to the compressed air. A mixed gas of the air with the fuel is burned in a combustion chamber 13 and a high-temperature combustion gas is generated. The pressure of this combustion gas rotates a high pressure turbine 15 that is a power source of the compressor 11 and a low pressure turbine 17 that is a power source of the fan 7 respectively. Then, the fan 7 that has been driven by the low pressure turbine 17 sends the air that has been taken into the fan case 5 rearward. Part of this air is sent into the compressor 11 and the remaining and greater part of air is emitted to the rear of the nacelle 1 via a structural guide vane (a static blade) 19. The aircraft (not shown) provided with the nacelle 1 obtains propulsive force with propulsive force obtained by this emitted air.

Figure 2:
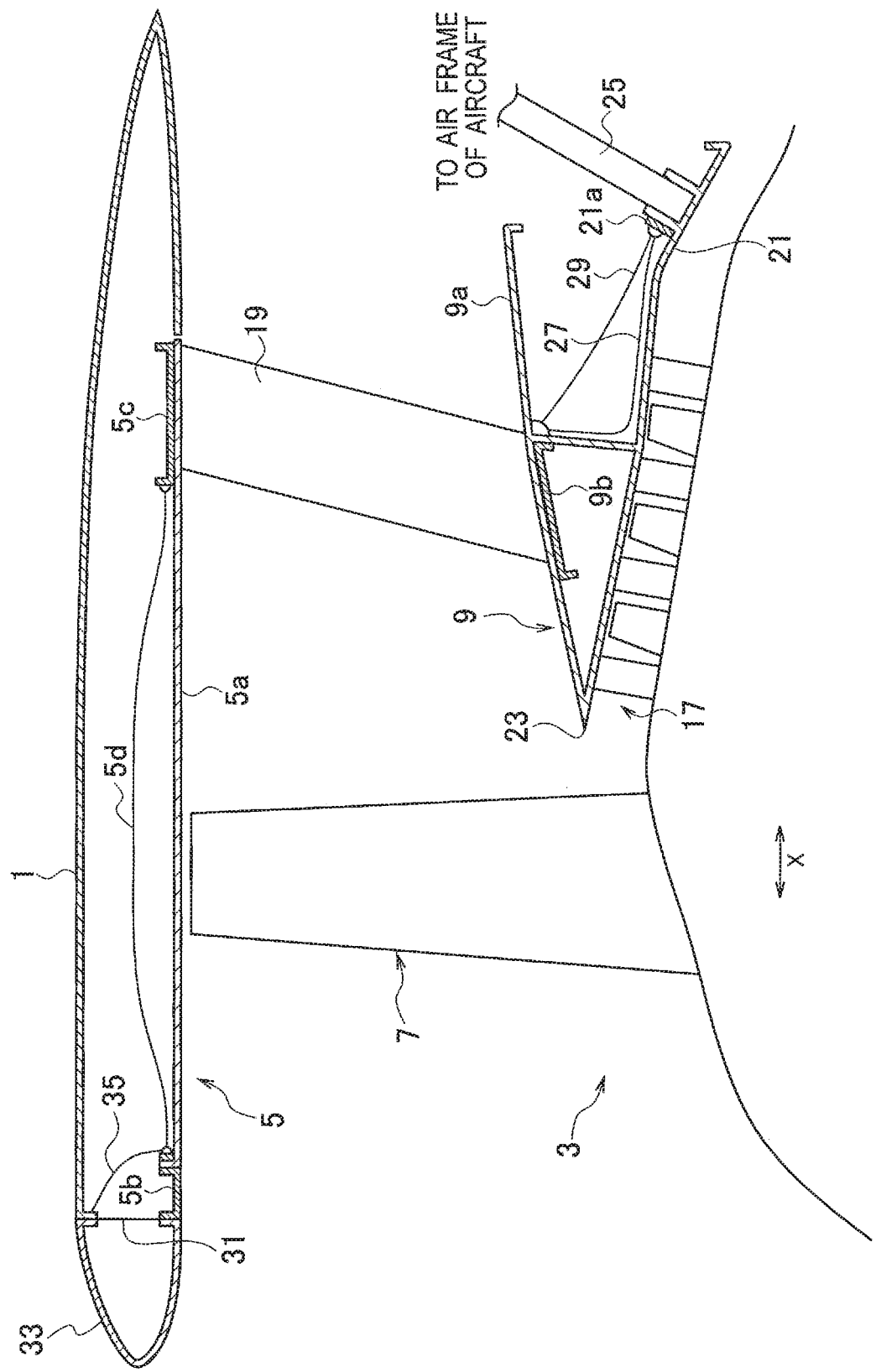
FIG. 2 is an explanatory diagram schematically showing a position to which the cylindrical case in FIG. 1 is applicable in the jet engine.

As shown in FIG. 2, the fan case 5 is coupled to the nacelle 1. An outer circumferential edge of the structural guide vane 19 is coupled to an inner circumferential surface of the fan case 5. An inner circumferential edge of the structural guide vane 19 is coupled to the engine case 9.

The engine case (a first cylinder section) 9 is connected and integrated with a compressor case (a second cylinder section) 21 that covers the compressor 11 of the jet engine 3 via a connection section 23 on an upstream-side end of the engine case 9 in an air taking-in direction of the jet engine 3. In other words, the engine case 9 and the compressor case 21 are integrated into a double-tube-shaped structural body having a V-shaped section by connection via the connection section 23. Here, a diameter of the compressor case 21 is smaller than that of the engine case 9. One end of a beam 25 is coupled to a rear-end-side outer circumferential surface of the compressor case 21 in the air taking-in direction of the jet engine 3. The other end of the beam 25 is coupled to the air frame (not shown) of the aircraft.

Incidentally, in the jet engine 3 shown in FIG. 1 and FIG. 2, the fan case 5 is coupled to the nacelle 1 and so forth. In addition, the engine case 9 is coupled to the fan case 5 via the structural guide vane 19. Further, the compressor case 21 that has been integrated with the engine case 9 is coupled to the air frame via the beam 25.

The structural guide vane 19 and the beam 25 are made of metals and have conductivity. Accordingly, when the nacelle 1 provided in the air frame (not shown) of the aircraft is struck by lightning, a path of a lightning current that ranges from the nacelle 1 to the air frame (not shown) through the fan case 5, the structural guide vane 19, the engine case 9, the connection section 23, the compressor case 21 and the beam 25 is formed. This conductive path runs via at least part of the jet engine 3.

On the other hand, in the jet engine 3 shown in FIG. 1 and FIG. 2, it is attempted to form the fan case 5 by using a composite material (for example, carbon fiber reinforced plastic: CFRP) obtained by impregnating reinforced fibers such as carbon fibers with a thermosetting resin such as an epoxy resin for achieving light weight.

In addition, although it is necessary to increase heat resistance thereof higher than that of the fan case 5, also in regard to a structure in which the engine case 9 and the compressor case 21 that is smaller in diameter than the engine case 9 are connected together on the connection section 23 and integrated into a double-tube shape, it is attempted to form it by use of the composite material similarly to the fan case 5.

On the other hand, as mentioned above, the electrical resistance of the composite material is high. Accordingly, in a case where the fan case 5 and the structure in which the engine case 9 and the compressor case 21 are integrated together are formed of the composite material, the lightning current cannot flow through them and it becomes impossible to ensure the path of the lightning current that has run via the jet engine 3.

Therefore, even when the fan case 5 and the structure in which the engine case 9 and the compressor case 21 are integrated together are formed of the composite material of high electrical resistance, the cylindrical case relating to the present embodiment has a structure enabling them to function as the path of the lightning current.

In the following, an example in which the cylindrical case of the present embodiment is applied to the fan case 5 will be described with reference to FIG. 3 to FIG. 5.

FIG. 3 is a perspective view enlargedly showing essential parts of the fan case 5. Note that, in FIG. 3, the fan case 5 is shown by extracting only one part thereof in a circumferential direction.

As shown in FIG. 3, the fan case 5 has a case body 5a, one pair of metal rings 5b and 5c, and at least one conductive cable 5d. The case body 5a is formed into a cylindrical shape by the composite material (in the following, simply referred to as the composite material for the convenience of description) of the carbon fiber reinforced plastic. The one pair of metal rings 5b and 5c are respectively arranged on both ends on an outer circumferential surface of the case body 5a in a central axis direction X of the fan case 5 (the case body 5a). The conductive cable 5d electrically connects between the metal rings 5b and 5c. The conductive cable 5d may be held on, for example, a front surface (the outer circumferential surface) of the case body 5a with a predetermined cable fixture.

Figure 4A:
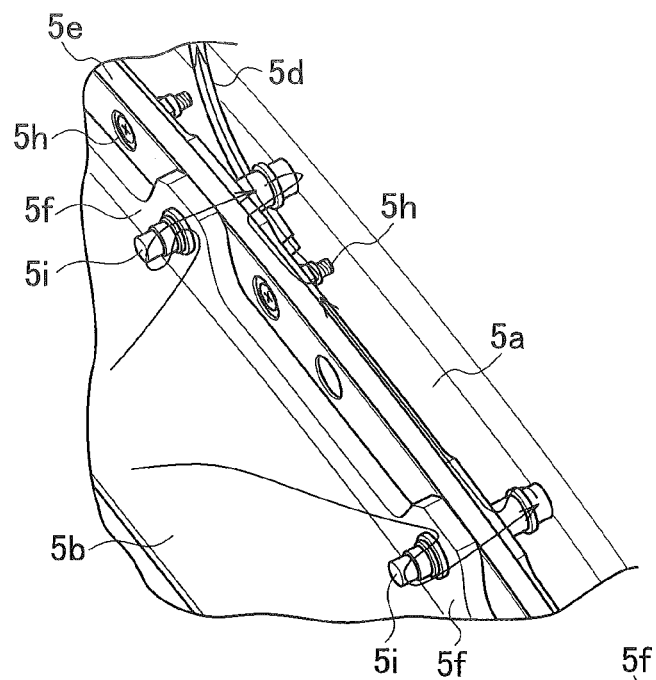
FIG. 4A is an enlarged perspective view showing essential parts of an attachment structure of a metal ring on the front-end side of the case body in FIG. 3, viewed from the front-end side of the case body.
Figure 4B:
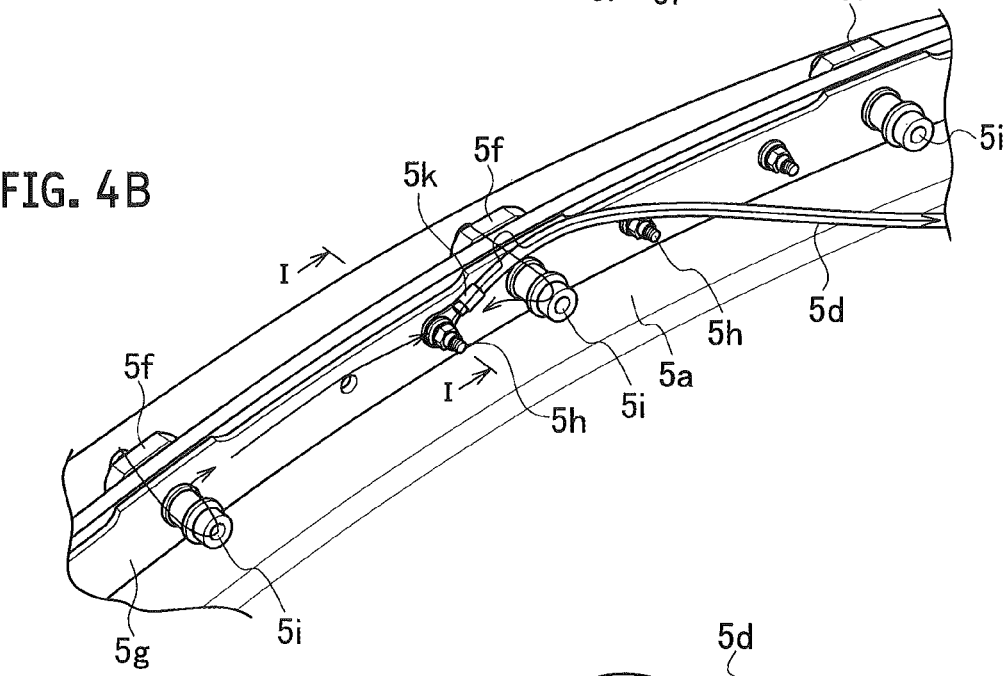
FIG. 4B is an enlarged perspective view showing the essential parts of the attachment structure of the metal ring on the front-end side of the case body in FIG. 3, viewed from the rear-end side of the case body.
Figure 4C:
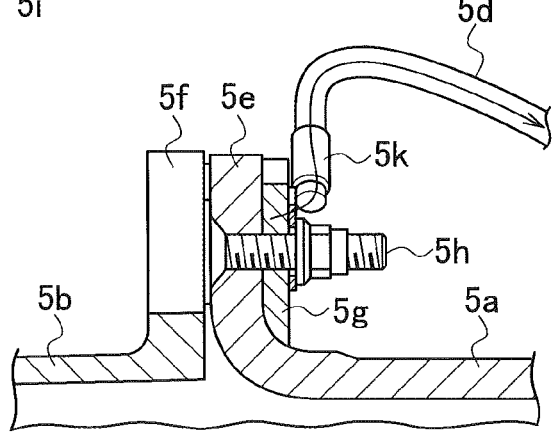
FIG. 4C is a sectional diagram along the I-I line in FIG. 4B.

FIG. 4A is an enlarged perspective view showing essential parts of an attachment structure of the metal ring 5b on the front-end side of the case body 5a, viewed from the front-end side of the case body 5a. FIG. 4B is an enlarged perspective view showing the essential parts of the attachment structure of the metal ring 5b on the front-end side of the case body 5a, viewed from the rear-end side of the case body 5a. In addition, FIG. 4C is a sectional diagram along the I-I line in FIG. 4B.

As shown in FIG. 4A, the metal ring 5b is arranged on the front-end side of the fan case 5 in the central axis direction X. The metal ring 5b has a plurality of fixing pieces 5f that is provided at intervals in a circumferential direction of the fan case 5. Each fixing piece 5f is brought into abutment on a folded-back part 5e that is formed on the front-end side of the fan case 5 in the central axis direction X. The folded-back part 5e extends from a front end of the case body 5a toward the inside of the fan case 5 as shown in FIG. 2 and FIG. 4C, In addition, as shown in FIG. 4B, a ring-shaped reinforcement plate 5g abuts on the folded-back part 5e of the case body 5a from the rear-end side in the central axis direction X. As shown in FIG. 4C, the reinforcement plate 5g is fixed to the folded-back part 5e of the case body 5a.

The folded-back part 5e of the case body 5a is reinforced with the reinforcement plate 5g. As shown in FIG. 4A, the folded-back part 5e is fixed to the metal ring 5b with a set screw 5i that has the conductivity on the fixing piece 5f of the metal ring 5b. Note that, in a case where corrosion resistant coating is performed on the entire surface of the metal ring 5b, the corrosion resistant coating is removed only from a part of the surface on which a washer of the set screw 5i abuts in the metal ring 5b and conductive coating is performed on the part. Thereby, a conductive path between the metal ring 5b and the set screw 5i is ensured.

Figure 5:
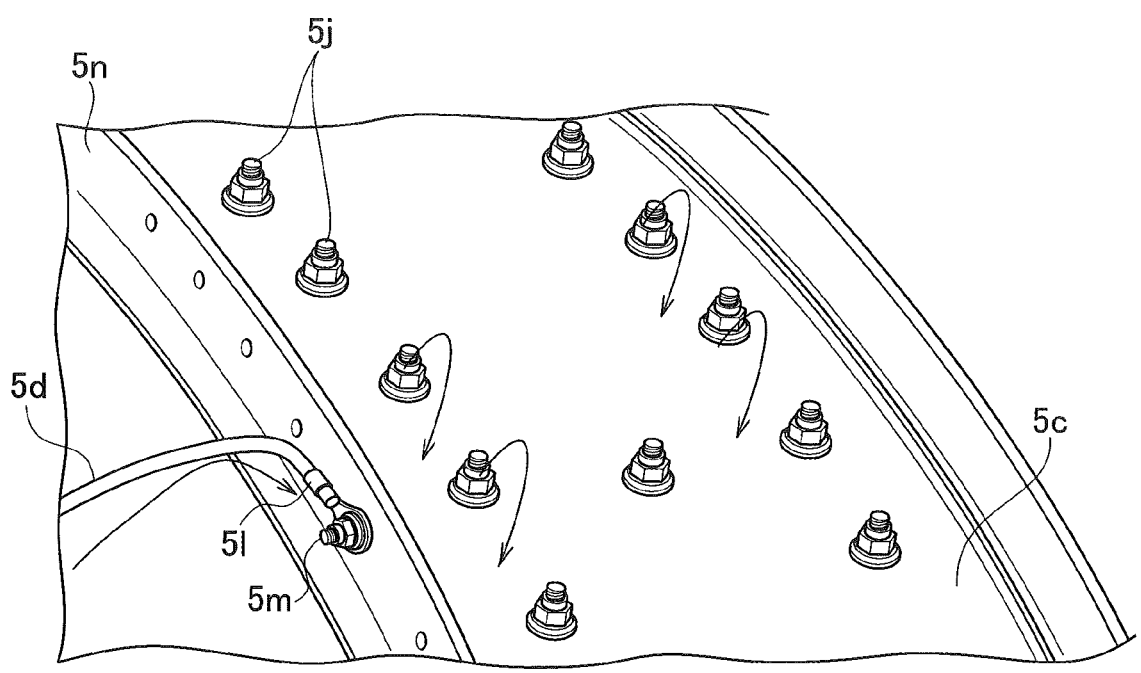
FIG. 5 is an enlarged perspective view showing essential parts of an attachment structure of a metal ring on the rear-end side of the case body in FIG. 3, viewed from the front-end side of the case body.

FIG. 5 is an enlarged perspective view showing essential parts of an attachment structure of the metal ring 5c on the rear-end side of the case body 5a, viewed from the front-end side of the case body 5a.

As shown in FIG. 3 and FIG. 5, the metal ring 5c is arranged on the rear-end side of the fan case 5 in the central axis direction X. The metal ring 5c is brought into abutment on a rear-end-side outer circumferential edge of the case body 5a in the central axis direction X of the case body 5a. The rear-end side of the case body 5a is nipped and held by the metal ring 5c and the structural guide vane 19 and is fixed with a set screw 5j. Here, the set screw 5j passes through the rear-end sides of the metal ring 5c and the case body 5a and is screwed to an outer circumferential edge of the structural guide vane 19 shown in FIG. 2.

As shown in FIG. 3, FIG. 4B and FIG. 4C, one end of the conductive cable 5d is connected to the reinforcement plate 5g. For example, a crimped terminal 5k is attached to one end of the conductive cable 5d, and this crimped terminal 5k is brought into press contact with and fixed to the reinforcement plate 5g with a set screw 5h.

Accordingly, as shown by arrows in FIG. 4A to FIG. 4C, the metal ring 5b is electrically connected with one end of the conductive cable 5d via the fixing piece 5f, the set screw 5i, the reinforcement plate 5g and the crimped terminal 5k. Note that, in a case where corrosion resistant coating is performed on the entire surface of the reinforcement plate 5g, the corrosion resistant coating is removed from only a part of the surface on which the crimped terminal 5k abuts in the reinforcement plate 5g and conductive coating is performed on the part. Thereby, a conductive path between the reinforcement plate 5g and the crimped terminal 5k is ensured.

Note that, the set screw 5h is also electrically connected with the crimped terminal 5k of the conductive cable 5d and the reinforcement plate 5g. However, the set screw 5h is not a member that is intentionally provided as an element of a conductive path between one ends of the metal ring 5b and the conductive cable 5d.

In addition, as shown in FIG. 5, the other end of the conductive cable 5d is connected to an attachment piece 5n of the metal ring 5c. For example, a crimped terminal 5l is attached to the other end of the conductive cable 5d and this crimped terminal 5l is brought into press contact with and is fixed to the attachment piece 5n with a set screw 5m. The attachment piece 5n is formed into a ring shape and stands upright on the front-end side of the metal ring 5c in the central axis direction X.

Accordingly, as shown by arrows in FIG. 5, the metal ring 5c is electrically connected with the other end of the conductive cable 5d via the attachment piece 5n and the crimped terminal 5l. Note that, in a case where corrosion resistant coating is performed on the entire surface of the metal ring 5c, the corrosion resistant coating is removed from only a part of the surface on which the crimped terminal 5l abuts in the metal ring 5c and conductive coating is performed on the part. Thereby, a conductive path between the metal ring 5c and the crimped terminal 5l is ensured.

Note that the set screw 5m is electrically connected with the crimped terminal 5l of the conductive cable 5d and the metal ring 5c. However, the set screw 5m is not a member that is intentionally provided as an element of a conductive path between the other ends of the metal ring 5c and the conductive cable 5d.

As shown by the arrows in FIG. 5, the metal ring 5c is electrically connected to the structural guide vane 19 via the set screw 5j that has the conductivity. Note that, in a case where corrosion resistant coating is performed on the entire surface of the metal ring 5c, the corrosion resistant coating is removed from only a part of the surface on which a washer of the set screw 5j abuts in the metal ring 5c and conductive coating is performed on the part. Thereby, a conductive path between the metal ring 5c and the set screw 5j is ensured.

As a result, the metal ring 5b and the metal ring 5c are electrically connected together by the conductive cable 5d.

Accordingly, even when the case body 5a of the fan case 5 is formed of the composite material, electric connection between the nacelle 1 and the structural guide vane 19 via the fan case 5 is ensured. Therefore, the fan case 5 functions as the path of the lightning current that has run via the jet engine 3.

Note that it is desirable that the conductive cables 5d be arranged at positions that are spaced at intervals in the circumferential direction of the fan case 5 and they electrically connect between the metal ring 5b and the metal ring 5c. In this case, the path of the lightning current between the metal rings 5b and 5c is dispersed in a circumferential direction of the case body 5a.

Therefore, it is possible to prevent the lightning current that flows between the metal ring 5b and the metal ring 5c from intensively flowing into the specific conductive cable 5d. Accordingly, even when the lightning current is large, a load on each conductive cable 5d is reduced.

That is, the lightning current does not intensively flow into the specific conductive cable 5d. Accordingly, for example, even in a case where an electronic device (not shown) are mounted on the outer circumferential surface of the case body 5a, such a thing can be avoided that the lightning current is induced to the electronic device located near the specific conductive cable 5d and the electronic device gets out of order.

Note that the present embodiment can be applied also to a case where the structure in which the engine case 9 and the compressor case 21 are connected and integrated together on the connection section 23 is formed of the composite material.

In this case, the case body of the engine case 9 is formed of the composite material. In addition, a metal ring 9b that has the same structure as the metal ring 5c is installed on an inner circumferential surface (for example, a lower surface of the engine case 9 in FIG. 2) of a bypass flow path constituting section 9a in the case body of the engine case 9. Further, an inner circumferential edge of the structural guide vane 19 is coupled to the metal ring 9b with a conductive set screw and so forth that passes through the case body and the metal ring 9b and both are electrically connected together.

In addition, the case body of the compressor case 21 is also formed of the composite material. A metal ring 21a is arranged on a rear-end-side outer circumferential surface (for example, an upper surface of the compressor case 21 in FIG. 2) of the case body of the compressor case 21. The beam 25 is coupled to this metal ring 21a and both are electrically connected together.

Then, the metal ring provided on the bypass flow path constituting section 9a of the engine case 9 is electrically connected to the metal ring provided on the compressor case 21 via conductive cables 27 and 29 (see FIG. 2) that are the same as the conductive cable 5d. Here, both ends of the conductive cable 5d are fixed to the corresponding metal rings by use of, for example, crimped terminals and so forth.

Thereby, even when the respective case bodies of the engine case 9 and the compressor case 21 are formed of the composite material, electrical connection between the structural guide vane 19 and the air frame via the structure in which these cases are integrated together is ensured. Thereby, the integrated structure of the engine case 9 and the compressor case 21 functions as the path of the lightning current that has run via the jet engine 3.

Note that, also in this case, for the same reason as that in the case where the cylindrical case relating to the present embodiment has been applied to the fan case 5, it is desirable to electrically connect between the metal ring provided on the engine case 9 and the metal ring provided on the compressor case 21 by the conductive cables 27 and 29 at positions that are spaced at intervals in the circumferential directions thereof.

Note that it may be possible to route the conductive cable so as to bring it closer to the outer circumferential surface of the compressor case 21 as shown with the conductive cable 27 in FIG. 2, or to route it by separating it from the outer circumferential surface of the compressor case 21 as shown with the conductive cable 29 in FIG. 2. However, in comparison of both, it is favorable to route the conductive cable so as to bring it closer to the outer circumferential surface of the compressor case 21.

This is due to that the larger a sectional area of a space between the conductive cable and the outer circumferential surface of the compressor case 21 is, the more a magnetic field caused by a current that flows through the conductive cable is prone to appear as a magnetic flux. Therefore, for example, it is possible to suppress occurrence of a malfunction of the electronic device mounted on the outer circumferential surface of the compressor case 21 caused by electromagnetic waves by routing the conductive cable so as to bring it closer to the outer circumferential surface of the compressor case 21.

Further, in the above-mentioned embodiment, the lightning current is guided from the metal ring 5b to the conductive cable 5d on the front-end side of the case body 5a. However, as shown in FIG. 2, the lightning current may be guided from a cowl 33 that is connected to the front end of the nacelle 1 and the front end of the metal ring 5b via a metal panel 31 to the conductive cable 5d without passing through the metal ring 5b.

In this case, a crimped terminal (not shown) on the rear-end side of a conductive cable 35 shown in FIG. 2 is fixed to the reinforcement plate 5g together with the crimped terminal 5k with the set screw 5h shown in FIG. 3. In addition, a crimped terminal (not shown) on the front-end side of the conductive cable 35 is attached to, for example, the metal panel 31. Thereby, the lightning current is guided from the cowl 33 to the metal ring 5c via the metal panel 31 and the conductive cables 35 and 5d.

Accordingly, in case of the embodiment that uses the above-mentioned conductive cable 35, the cowl 33 functions as a metal ring that constitutes the path of the lightning current.

Then, since the metal ring 5b is not used as the conduction path, for example, it becomes unnecessary to remove the corrosion resistant coating on the part on which the washer of the set screw 5i abuts in the metal ring 5b.

In the present embodiment, the one pair of metal rings are arranged on the surface of the case body formed of the composite material of the reinforced fibers with the thermosetting resin. These metal rings are provided at intervals in the central axis direction of the case body and are electrically connected together via the conductive cable provided therebetween. That is, the conductivity between the respective metal rings is ensured by the conductive cable that links them together. Moreover, the respective metal rings are coupled to conductive parts of the air frame of the aircraft or the jet engine that is located on the path of the lightning current.

Therefore, even in the presence of the case body formed of the composite material on the path of the lightning current, the one pair of metal rings and the conductive cable constitute the path of the lightning current at the position where the case body is provided. Accordingly, the cylindrical case of the jet engine can function as the path of the lightning current.

That is, even in a case where the cylindrical case includes the case body formed of the composite material of high electrical resistance that cannot constitute the path of the lightning current, the cylindrical case can function as the path of the lightning current (for example, the conduction path when the nacelle of the aircraft has been struck by lightning).

In addition, in a case where the plurality of conductive cables is provided and each conductive cable electrically connects between the one pair of metal rings at the positions that are spaced at intervals in the circumferential direction of the case body, the path of the lightning current between both of the metal rings is dispersed in the circumferential direction of the case body.

Therefore, it is possible to prevent the lightning current that flows between the metal ring 5b and the metal ring 5c from intensively flowing into the specific conductive cable 5d. Accordingly, even when the lightning current is large, the load on each conductive cable 5d is reduced.

In addition, since the lightning current does not intensively flow into a specific conductive cable, it is possible to prevent electronic devices from getting out of order even in a case where the electronic devices are mounted on the cylindrical case, the lightning current is induced into one or more of the electronic devices that are located near the specific conductive cable, and the lightning current flows therethrough.

The cylindrical case of the present embodiment is used, for example, as the fan case that covers the fan blade of the jet engine. In this case, in the one pair of metal rings, one is coupled to the nacelle of the aircraft and the other is coupled to the outer circumferential edge of the structural guide vane of the jet engine, and the conductive cable that electrically connects both of them together is provided between these metal rings. Accordingly, the path of the lightning current can be constituted on the fan case.

The cylindrical case of the present embodiment is formed into the double-tube shape in which, for example, the first cylinder section and the second cylinder section that is smaller in diameter than the first cylinder section are connected together by the connection section. In this case, the one pair of metal rings are arranged on the respective surfaces of the first cylinder section and the second cylinder section one by one and the conductive cable that electrically connects both of them together is provided between these metal rings. The cylindrical case of the double-tube shape can also function as the path of the lightning current.

The first cylinder section may be also used as the engine case that faces the fan case covering the fan blade of the jet engine and is arranged inside the fan case, and the second cylinder section may be also used as the compressor case that covers the compressor of the jet engine. That is, one of the pair of metal rings, such as the metal ring 9b may be also provided on the engine case of the jet engine to which the inner circumferential edge of the structural guide vane of the jet engine is coupled. In addition, the other of the pair of metal rings, such as the metal ring 21a, may be also provided on the compressor case of the jet engine that is coupled to the beam having one end coupled to the air frame. In this case, since these metal rings 9b and 21a are electrically connected together by the conductive cable, the engine case and the compressor case can function as the conduction path of the lightning current.

Note that, in a case where the cylindrical case of the present embodiment is used in a structural part of the jet engine, the above-mentioned operational effects are obtained also in this jet engine.

What is claimed is:

1. A cylindrical case, comprising:
a case body formed of a composite material obtained by impregnating reinforced fibers with a thermosetting resin, the case body constituting a cylindrical structural part of a jet engine, the cylindrical structural part extending in a direction from a front of the case body to a rear thereof, and including a folded-back part provided on a front-end side of the case body and extending radially outward;
a pair of cylindrical metal rings that are arranged at intervals in a central axis direction of the case body on a surface of the case body, one of the pair of the cylindrical metal rings located in front of the case body and coupled to a conductive part of the jet engine or an air frame of an aircraft in which the jet engine is mounted, the other of the pair of the cylindrical metal rings coupled to another conductive part of the jet engine or the air frame of the aircraft;
a reinforcement plate fixed to the one of the pair of the cylindrical metal rings through the folded-back part of the case body, and being electrically connected to the one of the pair of the cylindrical metal rings; and
at least one conductive cable that electrically connects between the one of the pair of the cylindrical metal rings and the other of the pair of the cylindrical metal rings through the reinforcement plate.

2. The cylindrical case according to claim 1, wherein
the at least one conductive cable includes a plurality of conductive cables arranged at intervals in a circumferential direction of the case body, and
each of the plurality of conductive cables electrically connects between the one of the pair of the cylindrical metal rings and the other of the pair of the cylindrical metal rings through the reinforcement plate.

3. The cylindrical case according to claim 2, wherein
the cylindrical case is formed as a fan case that covers a fan blade of the jet engine, and the one of the pair of the cylindrical metal rings is coupled to a nacelle of the aircraft and the other of the pair of the cylindrical metal rings is coupled to an outer circumferential edge of a structural guide vane of the jet engine.

4. The cylindrical case according to claim 2, wherein the case body is formed into a double tube shape including: a first cylinder section and a second cylinder section that is smaller in diameter than the first cylinder section, and a connection section connecting between the first cylindrical section and the second cylindrical section, and a second pair of cylindrical metal rings are arranged on respective surfaces of the first cylinder section and the second cylinder section one by one.

5. The cylindrical case according to claim 4, wherein the first cylinder section is an engine case that faces a fan case covering a fan blade of the jet engine and is arranged inside the fan case, the second cylinder section is a compressor case covering a compressor of the jet engine, and one of the second pair of cylindrical metal rings is coupled to an inner circumferential edge of a structural guide vane of the jet engine and the other of the second pair of cylindrical metal rings is coupled to a beam having one end coupled to the air frame.

6. The cylindrical case according to claim 1, wherein
the cylindrical case is formed as a fan case that covers a fan blade of the jet engine, and the one of the pair of the cylindrical metal rings is coupled to a nacelle of the aircraft and the other of the pair of the cylindrical metal rings is coupled to an outer circumferential edge of a structural guide vane of the jet engine.

7. The cylindrical case according to claim 1, wherein the case body is formed into a double tube shape including: a first cylinder section and a second cylinder section that is smaller in diameter than the first cylinder section, and a connection section connecting between the first cylindrical section and the second cylindrical section, and a second pair of cylindrical metal rings are arranged on respective surfaces of the first cylinder section and the second cylinder section one by one.

8. The cylindrical case according to claim 7, wherein the first cylinder section is an engine case that faces a fan case covering a fan blade of the jet engine and is arranged inside the fan case, the second cylinder section is a compressor case covering a compressor of the jet engine, and one of the second pair of cylindrical metal rings is coupled to an inner circumferential edge of a structural guide vane of the jet engine and the other of the second pair of cylindrical metal rings is coupled to a beam having one end coupled to the air frame.

9. A jet engine comprising
a cylindrical case according to claim 1 for a cylindrical structural part.

10. The cylindrical case according to claim 1, wherein the at least one conductive cable includes crimped terminals separately provided from the at least one conductive cable and attached to both ends of the at least one conductive cable.

11. The cylindrical case according to claim 1, wherein the one of the pair of the cylindrical metal rings includes a plurality of fixing pieces provided at intervals in a circumferential direction of the case body, the fixing pieces protruding radially outward and fixed to the reinforcement plate through the folded-back part of the case body, and an end of the at least one conductive cable is disposed circumferentially between two consecutive fixing pieces.

12. The cylindrical case according to claim 1, wherein the at least one conductive cable is connected to the reinforcement plate to be electrically connected by the pair of cylindrical metal rings.

* * * * *